Figure 1:
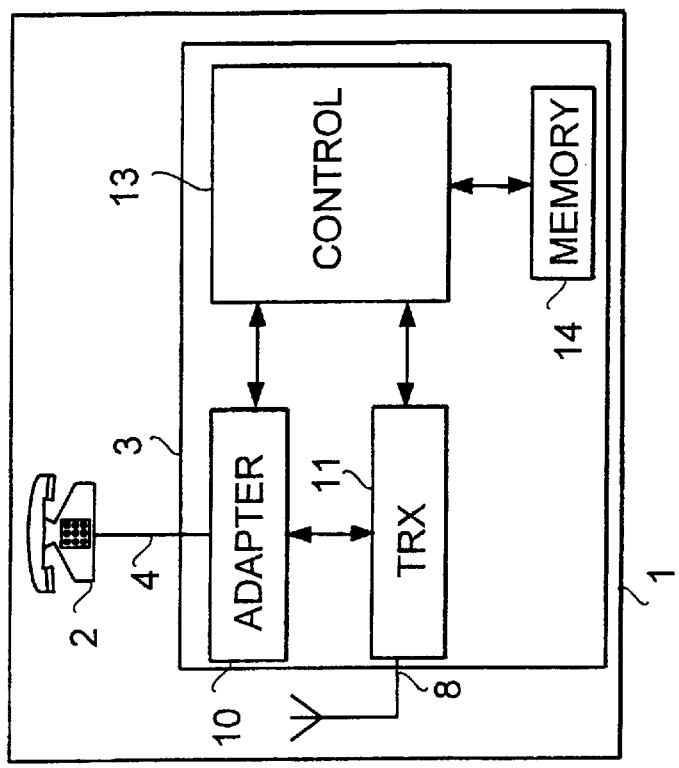
Figure 1:
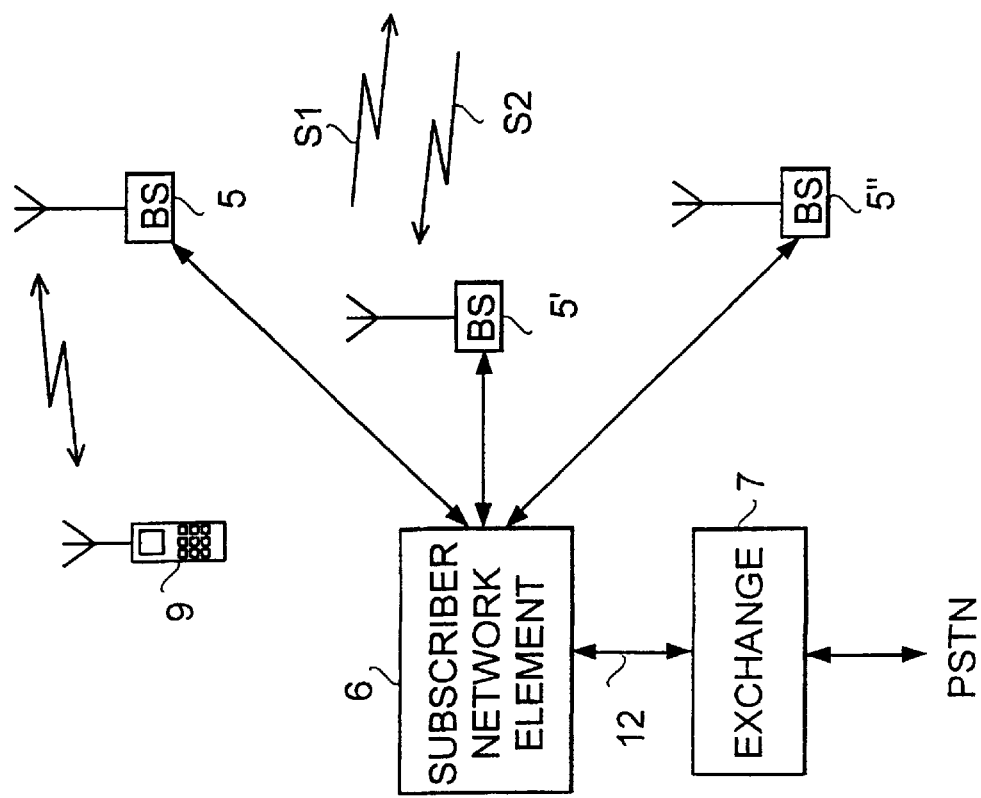

United States Patent
Lähdemäki

[19]

[11] Patent Number: 6,167,257
[45] Date of Patent: Dec. 26, 2000

[54] METHOD FOR REMOTELY CHANGING THE TELECOMMUNICATION SETTINGS OF A SUBSCRIBER STATION

[75] Inventor: Heimo Lähdemäki, Vermuntila, Finland

[73] Assignee: Nokia Telecommunications Oy, Espoo, Finland

[21] Appl. No.: 09/125,864

[22] PCT Filed: Mar. 6, 1997

[86] PCT No.: PCT/FI97/00152

§ 371 Date: Aug. 26, 1998

§ 102(e) Date: Aug. 26, 1998

[87] PCT Pub. No.: WO97/33443

PCT Pub. Date: Sep. 12, 1997

[30] Foreign Application Priority Data

Mar. 7, 1996 [FI] Finland .................................. 96/1075

[51] Int. Cl.⁷ .................................................. H04M 3/00
[52] U.S. Cl. ........................... 455/419; 455/418; 455/455
[58] Field of Search ..................................... 455/418, 419, 455/420, 450, 451, 452, 522, 436, 455

[56] References Cited

U.S. PATENT DOCUMENTS

| | | | |
|---|---|---|---|
| 5,109,403 | 4/1992 | Sutphin | 455/419 |
| 5,265,119 | 11/1993 | Gilhousen et al. | 455/522 |
| 5,297,191 | 3/1994 | Gerszberg | 455/419 |
| 5,432,840 | 7/1995 | Ryden | 455/456 |
| 5,574,972 | 11/1996 | Hulbert | 455/522 |
| 5,734,963 | 3/1998 | Fitzgerald et al. | 455/452 |
| 5,845,212 | 12/1998 | Tanaka | 455/522 |
| 5,940,763 | 8/1999 | Alperovich et al. | 455/452 |

FOREIGN PATENT DOCUMENTS

| | | |
|---|---|---|
| 0 652 680 | 5/1995 | European Pat. Off. . |
| 0 739 148 | 10/1996 | European Pat. Off. . |
| 960183 | 1/1996 | Finland . |
| 2 249 923 | 5/1992 | United Kingdom . |
| 2 277 849 | 11/1994 | United Kingdom . |
| 2 292 046 | 2/1996 | United Kingdom . |
| WO 95/02927 | 1/1995 | WIPO . |
| WO 96/27270 | 9/1996 | WIPO . |
| WO 96/38995 | 12/1996 | WIPO . |

OTHER PUBLICATIONS

International Search Report for PCT FI97/00152.

*Primary Examiner*—Reinhard J. Eisenzopf
*Assistant Examiner*—Eliseo Ramos-Feliciano
*Attorney, Agent, or Firm*—Altera Law Group, LLC

[57] ABSTRACT

The present invention relates to a method of changing the telecommunication settings of a subscriber station in a radio system providing a wireless subscriber interface. For easy and swift changing of the telecommunication settings the subscriber station is equipped with means for changing its telecommunication settings as a response to a message received by the subscriber station over the radio path, a message is transmitted to the subscriber station including new telecommunication settings, and an acknowledgment of the implementation of the new telecommunication settings is awaited from the subscriber station.

8 Claims, 2 Drawing Sheets

| CHANNEL NO. | PREFIX | TA NO | MOBILE SUBSCRIBER NO | INFORMATION |
|---|---|---|---|---|
| N1N2N3 | P(12) | Y1Y2 | ZX1X2X3X4X5X6 | A1A2A3 |

| CHANNEL NO. | PREFIX | MOBILE SUBSCRIBER NO | AREA INFO | MOBILE SUBSCRIBER NO | IDLE |
|---|---|---|---|---|---|
| N1N2N3 | P(1) | ZX1X2X3X4X5X6 | T | A1A2A3A4 | |

METHOD FOR REMOTELY CHANGING THE TELECOMMUNICATION SETTINGS OF A SUBSCRIBER STATION

The present invention relates to a method of changing the telecommunication settings of a subscriber station in a radio system providing a wireless subscriber interface. The invention further relates to a radio system providing a wireless subscriber interface and comprising a subscriber network element in a data transmission connection with a local exchange of a public telephone network, base stations and subscriber stations, the subscriber network element and said base stations comprising means for transferring telecommunication signals between the local exchange and the subscriber stations. The invention further relates to a subscriber station of a radio system providing a wireless subscriber interface and consisting of terminal equipment having a radio part, and of a user interface linked to the terminal equipment by means of a two-wire line.

In this connection, the concept telecommunication setting refers to the parameters in a subscriber station affecting the telecommunication connection between the subscriber station and the system subscriber network element. That is, said telecommunications settings include e.g. the radio cell identity and the frequency of the calling channel the subscriber station should utilize, the maximum transmission output level used by the subscriber station, and information indicative of the subscriber station call set-up procedure (transparent vs. non-transparent).

The invention relates to the operation of a subscriber station used in a WLL system (Wireless Local Loop), that is, a radio system providing a wireless subscriber interface. In the WLL system, a usual two-wire telephone set is linked by means of special terminal equipment via a radio connection to a local exchange in a telephone network, the exchange in turn being linked to the public telephone network via network cabling. In this connection, a subscriber station refers to the equipment available to a subscriber for transmitting and receiving telecommunication signals, that is, in the case of a special WLL subscriber station, it comprises terminal equipment consisting of a radio part and a tele-adapter (to which a user interface, such as a telephone set, is connected), and a user interface, such as a telephone, a telefax terminal, a computer/modem combination or the like, connected to the terminal equipment.

In WLL systems, the terminal equipment of a subscriber station is also located on subscriber premises where the operator maintenance personnel often have no easy entry. In practice, this has caused problems, e.g. when the system has to be reconfigured and the telecommunications settings have to be modified. A typical situation is when a new radio cell is set up near a radio cell that has been congested, the geographical areas covered by the cells being at least partially overlapping. In this case it is usually desirable to move part of the subscriber stations covered by the old radio cell to be covered by the new cell to equalize cell load. In known WLL systems such network reconfiguration has always called for manual changes by the operator maintenance personnel in all subscriber stations to be moved to the new cell. It is evident that this operation is slow and extremely laborious.

It is an object of the present invention to solve the above problem and to provide an easier and faster method of changing the telecommunication settings of a subscriber station. This object is achieved with the method of the invention, characterized in that the subscriber station is equipped with means for changing its telecommunication settings as a response to a message received by the subscriber station over the radio path, a message containing new telecommunication settings is transmitted to the subscriber station, and an acknowledgement of the implementation of the new telecommunication settings is awaited from the subscriber station.

The invention is based on the idea that controlling subscriber stations in the WLL system becomes significantly easier if the subscriber stations are equipped with means by which the telecommunications settings can be changed over the radio path. Consequently, e.g. moving a subscriber station from one cell to another in connection with network reconfiguration becomes significantly easier as the operator can control the subscriber station as desired by a message transmitted directly from the network management centre. This facilitates system management considerably, as each modification in connection with system configuration is no longer subject to operator maintenance personnel visiting all the subscribers whose subscriber stations are affected by the reconfiguration.

The invention further relates to a radio system to which the method of the invention can be applied. The radio system of the invention is characterized in that the subscriber network element comprises means for transmitting a predetermined message via a base station over the radio path to a given subscriber station in order to change its telecommunication settings, and that the subscriber station comprises means for changing its telecommunication settings as a response to information contained in the message, and means for transmitting an acknowledgement over the radio path via the base station to the subscriber network element in order to confirm the implementation of the new telecommunication settings.

In a preferred embodiment of the system of the invention, signalling between the subscriber station and the subscriber network element is essentially similar to that defined in NMT-900 specifications, the subscriber network element being arranged to use frame $1a$, $1a'$, $1a''$ or $1b$ defined in NMT-900 specifications point 4.3.2.1 as said predetermined message, and the subscriber station is arranged to acknowledge the implementation of the new telecommunication settings to the subscriber network element by frame $10a$ or $10d$ defined in NMT-900 specifications point 4.3.2.2. This embodiment of the invention provides a chance to apply the method of the invention to the WLL system based on the NMT-900 mobile communication system, the signalling of the subscriber station and the subscriber network element associated with changing the telecommunication settings being formed such that subscriber stations of the NMT-900 system can also be utilized in the system. This means that although all aspects of the signalling of the subscriber network element are not similar to the signalling defined in the NMT-900 specifications, the differences are, however, insignificant as regards the operation of a conventional NMT-900 mobile station, and consequently do not cause disturbance. Thus, the solution of the invention also allows the signalling associated with changing the telecommunication settings of a subscriber station to be completely implemented on a system calling channel, which speeds up the operation and reserves less resources than if a traffic channel had to be assigned to the subscriber station before its telecommunications settings could be changed.

The invention further relates to a subscriber station for applying the method of the invention, and suited for use in the system of the invention. The subscriber station of the invention is characterized in that the terminal equipment comprises means for changing the telecommunication settings of the subscriber station as a response to a predetermined message received over the radio path. The subscriber station of the invention allows the telecommunications settings of the terminal equipment on subscriber premises to be changed without a visit from operator maintenance personnel, and without the subscriber being aware of the change in the telecommunications settings of his/her subscriber station.

In a preferred embodiment of the subscriber station of the invention the subscriber station comprises means for changing the telecommunication settings associated with the radio cell it uses as a response to a message received from the radio path. This embodiment of the invention allows the subscriber station to be transferred from a radio cell to another, or e.g. communicating of a new calling channel to be taken into use to the subscriber station by a very simple procedure.

The preferred embodiments of the method, system and subscriber station of the invention are disclosed in the attached dependent claims 2, 4 to 5, and 8 to 10.

Figures 2, 3A, 3B:
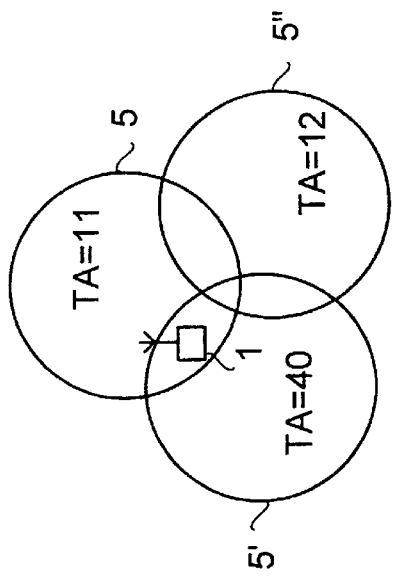

In the following the invention will be described in greater detail by means of a preferred embodiment of the invention with reference to the accompanying drawings, in which FIG. 1 shows a block diagram of a first preferred embodiment of the system of the invention, FIG. 2 illustrates the mutual location of the radio cells in the system of FIG. 1, and FIG. 3A and 3B illustrate signalling frames utilized in the system of FIG. 1.

FIG. 1 shows a block diagram of a first preferred embodiment of the system of the invention. FIG. 1 shows the part of the WLL system to which the method of the invention can be applied. The WLL system shown in FIG. 1 is based on the NMT-900 system (Nordisk Mobil Telefon), simplified by irrelevant properties having been omitted. Base stations 5, 5', 5" are similar to parts of the NMT-900 cellular radio system. This means that signalling between a subscriber station 1 and the base stations is quite similar to the signalling between a subscriber station and a base station in the NMT-900 mobile communication system. Consequently, calls to a conventional NMT-900 system mobile station 9 can also be forwarded via the base stations 5, 5' and 5" and a subscriber network element 6, provided that the operator has programmed the subscriber network element 6 for forwarding calls regarding said telephone.

The subscriber station 1 shown in FIG. 1 consists of a user interface, i.e. a telephone set 2, and terminal equipment 3. The telephone set 2 shown in FIG. 1 can be a conventional voice-frequency telephone set connectable to a fixed telephone network. A two-wire line 4, via which signals can be transferred between the terminal equipment and the telephone set connects the telephone set 2 and the terminal equipment 3 in FIG. 1. The terminal equipment 3 comprises signal processing means for adapting a speech path to a radio channel. Such signal processing means include e.g. a radio part 11 comprising an antenna 8, a radio transmitter and a radio receiver, and a teleadapter 10 for fitting the radio part to a conventional telephone set 2.

The subscriber station 1 uses radio frequency signals to communicate via the antenna 8 with the base station 5' via which calls are forwarded to the subscriber network element 6 and further to an exchange 7 in a PSTN network (Public Switched Telephone Network), i.e. a fixed telephone network. In the case of FIG. 1, the subscriber network element 6 can be linked to the local exchange of a fixed telephone network via e.g. an open multiplexer interface of type CCITT Q.512 V2 or V5.1 or V5.2 using a 2 Mbit/s PCM system (Pulse Code Modulation).

The subscriber network element 6 shown in FIG. 1 is quite similar to the MTX exchange in the NMT-900 system except that properties irrelevant to the WLL system have been omitted, such as procedures associated with handover. Thus, the mobility of the subscriber stations of the system is limited to their home cells. In the system of FIG. 1 this has been implemented so that the home cell identity has been stored in the subscriber station 1. This means that the subscriber station monitors the calling channel of a given radio cell only if the cell identities of calls transmitted on that calling channel correspond to the cell identity stored in the subscriber station.

When the subscriber station 1 of FIG. 1 is used for the first time to establish a connection with the base station 5' of its home cell, the radio part 11 of the subscriber station utilizes the highest possible transmission output level. If at that moment the subscriber station is located very near the base station 5', this can cause disturbance in other subscriber stations also utilizing the base station 5'. In accordance with the invention, to prevent such disturbance, the operator can from e.g. the network management centre activate the subscriber network element 6 so that it transmits message S1, by which it changes the telecommunication settings of the subscriber station by defining the maximum transmission output of its transmitter. At this point, a control unit 13 in the subscriber station adjusts the transmission output level of the transmitter 11 on the basis of the maximum transmission output level included in message S1, and in addition it stores the value indicative of the maximum transmission output level in a memory 14 and transmits acknowledgement S2 to the base station 5' over the radio path in order to confirm the implementation of the new maximum transmission output level.

The memory 14 for storing the value indicative of the maximum transmission output level is of a type that keeps the information stored even if the operating voltage is switched off in the subscriber station 1. This way the control unit 13 can retrieve the maximum transmission output level (and other stored telecommunication settings) from the memory 14 after the subscriber station has been turned off and turned on again and the terminal equipment is reset, and adjust the transmitter 11 on the basis of this information.

It is known that WLL systems allow the utilization of two optional call set-up procedures when a call is made from a WLL subscriber station, i.e. transparent call set-up or non-transparent call set-up. In non-transparent call set-up the subscriber station generates the sound signals to be input into the user interface 2 before the call is connected, and buffers the dialling input by the user until the dialling is complete. The whole dialling is then transmitted via the subscriber network element to a local exchange of the telephone network, after which a speech path is connected between the user interface 2 and the telephone exchange, i.e. the user hears the voice-frequency signals forwarded from the telephone exchange 7.

In contrast, in transparent call set-up, the speech path is connected as soon as possible (immediately) between the telephone exchange 7 and the user interface 2 of the subscriber station, and the subscriber hears all the audible tones fed by the telephone exchange, and the dialling input by the subscriber is forwarded directly to the telephone exchange as the subscriber inputs it.

In the case of FIG. 1, the subscriber station 1 is capable of utilizing both above call set-up procedures. Thus the operator can define to the subscriber station via the network what call set-up procedure to use by sending to it relevant information by message S1. The control unit 13 then sees to it that the terminal equipment 3 uses the call set-up procedure assigned to it, and in addition stores information thereon in the memory 14 from which it can be read when the subscriber station is reset. Finally, the control unit 13 acknowledges the change in telecommunications settings by transmitting acknowledgement S2 to the subscriber network element 6 via the radio unit 11.

FIG. 2 illustrates the mutual location of the radio cells in the system of FIG. 1. As can be seen from FIG. 2, the geographical areas covered by the radio cells 5, 5' and 5" are partially overlapping. In this way the subscriber station 1 can alternatively utilize either the radio cell 5 or the radio cell 5' depending on its telecommunication settings.

In accordance with the invention, when a subscriber station 1 is manufactured, the cell identity is defined as TA=00H (Traffic Area code) in the telecommunication settings, i.e. the subscriber station observes all audible calling channels irrespective of the cell identity found on the calling channels. That is, the subscriber station 1 operates as a conventional subscriber station in the NMT mobile telephone system.

To lock the subscriber station 1 to a given radio cell, e.g. cell 5', the operator transmits message S1 including the cell identity TA=40 of the radio cell 5' from the network management centre to the subscriber station 1 via the subscriber network element 6 of FIG. 1. The control unit 13 of the subscriber station then makes the receiver of the subscriber station go through the calling channels available to the system until it finds the calling channel using the cell identity TA=40. The control unit then locks the radio part 11 of the terminal equipment 3 to said channel, stores the new cell identity in the memory 14, and transmits acknowledgement S2 to the subscriber network element 6 confirming the change in telecommunication settings. Having received the acknowledgement, the subscriber network element updates the location of the subscriber station 1.

However, if the subscriber station does not find a calling channel using the cell identity TA=40 included in message S1 within a predetermined time, e.g. two minutes from receipt of message S1, it returns to the original cell, and the cell identity remains TA=00H in the telecommunication settings.

The above can also be applied to the transfer and locking of a subscriber station, previously locked to a given radio cell, to another radio cell by transmitting to it message S1 including the identity of the new radio cell.

FIGS. 3A and 3B illustrate signalling frames utilized in the systems of the invention and of FIGS. 1 and 2.

To transfer the subscriber station 1 of FIGS. 1 and 2 to a given radio cell, the subscriber network element 6 transmits message S1 to the subscriber station 1 via a base station on a calling channel. A frame 1a, 1a', 1a" or 1b defined in the NMT-900 specifications point 4.3.2.1 (NMT Doc 900-1, Jan. 29, 1985) is preferably used as the message. FIG. 3A illustrates frame 1a (Calling Channel Indication, General). In accordance with this embodiment, variable Z is always assigned the value 0 and variable A1 the value 3. The new cell identity TA is communicated to the subscriber station by means of variables A2 and A3.

Having found a calling channel using the cell identity assigned to it, the subscriber station acknowledges the change in telecommunications settings by transmitting to the subscriber network element acknowledgement S2, preferably frame 10a or 10d defined in the NMT-900 specifications point 4.3.2.2. FIG. 3B illustrates frame 10a (Call acknowledgement from MS on calling channel, and access on access channel). In said frame variables A1, A2 and A3 are assigned the same values as in message S1, whereas the value of variable A4 is set to 0.

To set the maximum transmission output of the subscriber station 1 to a desired level, the subscriber network element transfers to the subscriber station, via a base station, message S1, i.e. in this embodiment the frame shown in FIG. 3A, where variable A1 is assigned the value 4, and where the maximum allowed transmission output level is given by variable A2, e.g. as follows:

A2=1→output level class 1

A2=2→output level class 2

A2=9→output level class 9

The subscriber station acknowledges the change in the maximum transmission output level by acknowledgement S2, i.e. in this embodiment by the frame of FIG. 3B, where the values of variables A1, A2 and A3 are the same as in message S1, and the value of variable A4 is 0.

To communicate the call set-up procedure, message S1 is transmitted to the subscriber station, i.e. in this embodiment the frame shown in FIG. 3A, where variable A1 is assigned the value 5, and where the maximum allowed transmission output level is given by variable A2, e.g. as follows:

A2=1→non-transparent state

A2=2→transparent state

The subscriber station acknowledges the change in the call set-up procedure by acknowledgement S2, i.e. in this embodiment by the frame of FIG. 3B, where the values of variables A1, A2 and A3 are the same as in message S1, and the value of variable A4 is 0.

It will be appreciated that the above description and the accompanying drawings are presented by way of illustration only. Thus the invention can also be applied to WLL systems not based on the NMT mobile telephone system. In addition, the changes in telecommunication settings performed on the subscriber station are not limited to the above, but any telecommunication setting of a subscriber station can be changed by applying the invention. It will be understood by those skilled in the art that various other modifications and changes may also be made without departing from the spirit and scope of the invention disclosed in the appended claims.

What is claimed is:

1. A method of changing the telecommunication settings of a subscriber station in a radio system providing a wireless subscriber interface, the method comprising:

transmitting to the subscriber station a message containing new telecommunication settings for transferring it to a specific radio cell, wherein said message contains a new cell identity, changing the telecommunication settings of the subscriber station as a response to the message received by the subscriber station over a radio path, the subscriber station including at least means for changing the telecommunication settings associated with the radio cell used, and awaiting from the subscriber station an acknowledgement of the implementation of the new telecommunication settings.

2. A radio system providing a wireless subscriber interface and comprising a subscriber network element in a data transmission connection with a local exchange of a public telephone network, base stations and subscriber stations, the subscriber network element and said base stations comprising means for transferring telecommunication signals between the local exchange and the subscriber stations, in which system the subscriber network element comprises means for transmitting a predetermined message via a base station over a radio path to a given subscriber station in order to change its telecommunication settings, and the subscriber station comprises means for changing its telecommunication settings as a response to information contained in the message (S1), and means for transmitting an acknowledgement over the radio path via the base station to the subscriber network element in order to confirm the implementation of the new telecommunication settings, wherein said message contains a new cell identity, the subscriber station comprises means for going through calling channels used by the system until it finds a calling channel using said new cell identity and the subscriber station transmits said acknowledgement to the subscriber network element and moves to said new calling channel.

3. The radio system as claimed in claim 2, wherein if the subscriber station does not find a calling channel using said new cell identity, it returns to the original calling channel without changing its telecommunication settings.

4. The radio system as claimed in claim 2, wherein signalling between the subscriber station and the subscriber network element corresponds to that defined in NMT-900 specifications, the subscriber network element being arranged to use frame 1a, 1a', 1a" or 1b defined in NMT-900 specifications point 4.3.2.1 as said predetermined message, and the subscriber station is arranged to acknowledge the implementation of the new telecommunication settings to the subscriber network element by frame 10a or 10d defined in NMT-900 specifications point 4.3.2.2.

5. A subscriber station of a radio system providing a wireless subscriber interface and consisting of terminal equipment having a radio part, and of a user interface linked to the terminal equipment by means of a two-wire line, said terminal equipment comprising means for changing telecommunication settings of the subscriber station as a response to a predetermined message received over a radio path, wherein the terminal equipment comprises means changing the telecommunication settings associated with a radio cell used as a response to the message received by the subscriber station, whereby the subscriber station is arranged to switch to utilize the new radio cell assigned to it by said message.

6. The subscriber station as claimed in claim 5, wherein the terminal equipment comprises means for transmitting a predetermined acknowledgement over the radio path as a response to the implementation of the new telecommunication settings.

7. The subscriber station as claimed in claim 5, wherein the terminal equipment comprises means for limiting a maximum transmission output level used by the subscriber station on the basis of information included in said message.

8. The subscriber station as claimed in claim 5, wherein the terminal equipment comprises means for changing the telecommunication settings associated with a call set-up of the subscriber station in order for a transparent or a non-transparent call set-up procedure to be chosen as a response to the information contained in the message received by the subscriber station.

\* \* \* \* \*

UNITED STATES PATENT AND TRADEMARK OFFICE
CERTIFICATE OF CORRECTION

PATENT NO.   : 6,167,257
DATED        : December 26, 2000
INVENTOR(S)  : Lähdemäki It is certified that error appears in the above-identified patent and that said Letters Patent is hereby corrected as shown below:

<u>Title page,</u>
In the Item [30] Foreign Application Priority Data, please replace "96/1075" with -- 961075 --

Signed and Sealed this

Nineteenth Day of March, 2002

Attest:

JAMES E. ROGAN
*Director of the United States Patent and Trademark Office*

*Attesting Officer*